US010953646B2

(12) United States Patent
Melamed

(10) Patent No.: US 10,953,646 B2
(45) Date of Patent: Mar. 23, 2021

(54) LAMINATING SYSTEM WITH CODED FILM CARTRIDGE

(71) Applicant: ACCO BRANDS CORPORATION, Lake Zurich, IL (US)

(72) Inventor: Aaron Melamed, Chicago, IL (US)

(73) Assignee: ACCO Brands Corporation, Lake Zurich, IL (US)

( * ) Notice: Subject to any disclaimer, the term of this patent is extended or adjusted under 35 U.S.C. 154(b) by 91 days.

(21) Appl. No.: 16/172,103

(22) Filed: Oct. 26, 2018

(65) Prior Publication Data
US 2020/0130341 A1  Apr. 30, 2020

(51) Int. Cl.
*B32B 37/22* (2006.01)
*B32B 37/00* (2006.01)
(Continued)

(52) U.S. Cl.
CPC ........ *B32B 37/226* (2013.01); *B32B 37/0053* (2013.01); *B32B 37/1207* (2013.01);
(Continued)

(58) Field of Classification Search
CPC ............ B32B 37/0053; B32B 37/1207; B32B 37/226; B32B 2037/0061; B32B 38/0004; B32B 41/00; B32B 2041/04; B32B 2309/02; B32B 2309/105; Y10T 156/1343; Y10T 156/1734
See application file for complete search history.

(56) References Cited

U.S. PATENT DOCUMENTS

| 2,411,368 A | 11/1946 | Dow |
| 3,566,132 A | 2/1971 | Walker |

(Continued)

FOREIGN PATENT DOCUMENTS

| BE | 1015675 A3 | 7/2005 |
| DE | 2950142 A1 | 6/1981 |

(Continued)

OTHER PUBLICATIONS

Translation of JP 2001 278517 A, Brother Ind Ltd, Japan, Oct. 10, 2001 (Year: 2001).*

(Continued)

*Primary Examiner* — George R Koch
(74) *Attorney, Agent, or Firm* — Michael Best & Friedrich LLP

(57) ABSTRACT

A dual roll laminating film cartridge includes a body defining a first end supporting first ends of first and second rolls of continuous translucent laminating film. The body further defines a second end supporting second ends of the first and second rolls, wherein facing surfaces of the films extended from the first and second rolls in an advancing direction are coated with a heat-activated adhesive. A bridge extends between the first and second ends of the body at a position between the first and second rolls, the bridge defining an article chute for the reception of articles to be laminated by the films of the first and second rolls. The cartridge further includes a code indicative of one or more characteristics of the film of the first and second rolls, the code comprising a predetermined flag pattern of coding tabs that project outward from the body.

20 Claims, 9 Drawing Sheets

(51) Int. Cl.
*B32B 37/12* (2006.01)
*B32B 38/00* (2006.01)
*B32B 41/00* (2006.01)

(52) U.S. Cl.
CPC .......... *B32B 38/0004* (2013.01); *B32B 41/00* (2013.01); *B32B 2037/0061* (2013.01)

(56) References Cited

U.S. PATENT DOCUMENTS

| | | |
|---|---|---|
| 3,802,085 A | 4/1974 | Schoonmaker |
| 4,149,925 A | 4/1979 | Mintz |
| 4,170,683 A | 10/1979 | Miklos |
| 4,188,139 A | 2/1980 | Pasini et al. |
| 4,234,300 A | 11/1980 | Yamagisi et al. |
| 4,422,402 A | 12/1983 | Ogihara |
| 4,505,772 A | 3/1985 | Renz |
| 4,795,513 A | 1/1989 | Jensen, Jr. |
| 4,844,629 A | 7/1989 | Hoyt |
| 5,042,843 A | 8/1991 | Kuhns et al. |
| 5,098,507 A | 3/1992 | Mao |
| 5,100,181 A | 3/1992 | Nathans et al. |
| 5,175,657 A | 12/1992 | Iftikar et al. |
| 5,209,374 A | 5/1993 | Seidl-Lichthardt |
| 5,219,625 A | 6/1993 | Matsunami et al. |
| 5,232,538 A | 8/1993 | Liu |
| 5,296,076 A | 3/1994 | Morita |
| 5,356,507 A | 10/1994 | Wojtanowitsch et al. |
| 5,365,874 A | 11/1994 | Dorfman |
| 5,368,677 A | 11/1994 | Ueda et al. |
| 5,404,022 A | 4/1995 | Stapleton |
| 5,439,539 A | 8/1995 | McLean |
| 5,447,333 A | 9/1995 | Kuhns et al. |
| 5,498,305 A | 3/1996 | Mailloux |
| 5,524,994 A | 6/1996 | Hirano et al. |
| 5,651,511 A | 7/1997 | Crowley et al. |
| 5,660,660 A | 8/1997 | Greuel, Jr. et al. |
| 5,670,015 A | 9/1997 | Finestone et al. |
| 5,727,684 A | 3/1998 | Webb et al. |
| 5,730,736 A | 3/1998 | Sawers et al. |
| 5,758,982 A | 6/1998 | Yoshida et al. |
| 5,807,461 A | 9/1998 | Hagstrom |
| 5,811,116 A | 9/1998 | Gilman et al. |
| 5,890,774 A | 4/1999 | Schwartz et al. |
| 6,015,600 A | 1/2000 | Greuel, Jr. et al. |
| 6,213,458 B1 | 4/2001 | Tamura et al. |
| 6,294,033 B1 | 9/2001 | Fukuoka et al. |
| 6,315,020 B1 | 11/2001 | Seki |
| 6,386,772 B1 | 5/2002 | Klinefelter et al. |
| 6,427,744 B2 | 8/2002 | Seki et al. |
| 6,431,243 B1 | 8/2002 | Ito et al. |
| D466,151 S | 11/2002 | Shinada et al. |
| D476,663 S | 7/2003 | Nonomura |
| D477,326 S | 7/2003 | Nonomura |
| 6,805,179 B2 | 10/2004 | Velasquez et al. |
| 6,810,934 B2 | 11/2004 | Sasaki et al. |
| 6,832,866 B2 | 12/2004 | Klinefelter et al. |
| 6,843,297 B2 | 1/2005 | McKay et al. |
| 6,887,541 B2 | 5/2005 | Benim et al. |
| 6,991,130 B2 | 1/2006 | Presutti et al. |
| D519,555 S | 4/2006 | Sasaki et al. |
| 7,081,286 B2 | 7/2006 | Benim et al. |
| D529,954 S | 10/2006 | Matsumoto |
| 7,128,236 B2 | 10/2006 | Presutti et al. |
| 7,138,033 B2 | 11/2006 | Hayasaka |
| D534,169 S | 12/2006 | Nakamura et al. |
| D537,110 S | 2/2007 | Nakata et al. |
| D537,875 S | 3/2007 | Yamada |
| D538,338 S | 3/2007 | Matsumoto |
| D541,851 S | 5/2007 | Hattori et al. |
| D541,852 S | 5/2007 | Hattori et al. |
| D542,341 S | 5/2007 | Hattori et al. |
| D542,342 S | 5/2007 | Hattori et al. |
| D542,343 S | 5/2007 | Hattori et al. |
| 7,267,857 B1 | 9/2007 | Singer |
| D569,421 S | 5/2008 | Matsumoto |
| D569,422 S | 5/2008 | Matsumoto |
| D571,397 S | 6/2008 | Matsumoto |
| D580,971 S | 11/2008 | Yuen |
| D585,090 S | 1/2009 | Ishizawa |
| D585,091 S | 1/2009 | Matsumoto |
| D585,488 S | 1/2009 | Nozawa |
| D587,307 S | 2/2009 | Iwamuro |
| D595,767 S | 7/2009 | Hashimoto |
| D595,768 S | 7/2009 | Hashimoto |
| D597,129 S | 7/2009 | Tatsumi et al. |
| D598,050 S | 9/2009 | Nozawa |
| D599,399 S | 9/2009 | Hattori et al. |
| D619,644 S | 7/2010 | Houman et al. |
| 7,766,063 B2 | 8/2010 | Lauder et al. |
| 7,766,064 B2 | 8/2010 | Pan |
| 7,793,608 B1 | 9/2010 | Udouj |
| D631,088 S | 1/2011 | Chadani et al. |
| D637,225 S | 5/2011 | Kishi et al. |
| 7,987,989 B2 | 8/2011 | Abell |
| 8,104,766 B2 | 1/2012 | Hara |
| D656,541 S | 3/2012 | Ko |
| 8,599,007 B2 | 12/2013 | Larsson et al. |
| 8,757,617 B2 | 6/2014 | Fukusada |
| 8,828,165 B2 | 9/2014 | Lee et al. |
| 8,967,892 B2 | 3/2015 | Ishii et al. |
| D729,312 S | 5/2015 | Harvey et al. |
| D746,903 S | 1/2016 | Kitagawa et al. |
| D746,906 S | 1/2016 | Kitagawa et al. |
| 9,358,814 B2 | 6/2016 | Izawa et al. |
| 9,566,771 B2 | 2/2017 | Meier et al. |
| 9,573,781 B2 | 2/2017 | Kanemaru et al. |
| D798,949 S | 10/2017 | Toba et al. |
| D812,680 S | 3/2018 | Takiguchi et al. |
| D819,123 S | 5/2018 | Kitagawa et al. |
| D833,519 S | 11/2018 | Yang et al. |
| D833,520 S | 11/2018 | Yang et al. |
| D844,630 S | 4/2019 | Sawai et al. |
| D851,275 S | 6/2019 | Spuhler et al. |
| D851,353 S | 6/2019 | Miller |
| 2001/0039998 A1 | 11/2001 | Senges |
| 2002/0177005 A1 | 11/2002 | Yamashita |
| 2002/0179222 A1* | 12/2002 | Velasquez ............. B32B 37/226 156/64 |
| 2003/0129335 A1 | 7/2003 | Benim et al. |
| 2004/0050497 A1 | 3/2004 | Presutti et al. |
| 2004/0050500 A1 | 3/2004 | Lemens et al. |
| 2005/0258634 A1 | 11/2005 | Dronzek, Jr. |
| 2006/0153736 A1 | 7/2006 | Kalra et al. |
| 2006/0213621 A1 | 9/2006 | Loibl |
| 2006/0254720 A1 | 11/2006 | Loibl |
| 2006/0272976 A1 | 12/2006 | Pinney et al. |
| 2007/0200002 A1 | 8/2007 | Raksha et al. |
| 2007/0218263 A1 | 9/2007 | Huang et al. |
| 2009/0314424 A1 | 12/2009 | Herring et al. |
| 2010/0059184 A1 | 3/2010 | Pan |
| 2010/0307690 A1 | 12/2010 | Chou |
| 2011/0045220 A1 | 2/2011 | Rush |
| 2011/0064337 A1 | 3/2011 | Barthel et al. |
| 2011/0143097 A1 | 6/2011 | Loibl |
| 2011/0303513 A1 | 12/2011 | Simonsen et al. |
| 2012/0067504 A1 | 3/2012 | Loibl |
| 2013/0098558 A1 | 4/2013 | Liu et al. |

FOREIGN PATENT DOCUMENTS

| | | |
|---|---|---|
| DE | 19744595 A1 | 4/1999 |
| DE | 20012519 U1 | 11/2000 |
| DE | 20100328 U1 | 3/2001 |
| DE | 10004486 A1 | 8/2001 |
| DE | 202005005020 U1 | 6/2005 |
| DE | 60029505 T2 | 2/2007 |
| DE | 202009000903 U1 | 2/2010 |
| DE | 102008057006 A1 | 5/2010 |
| DE | 102015223137 A1 | 5/2017 |
| EP | 1724111 A2 | 11/2006 |
| EP | 2127868 A2 | 12/2009 |
| EP | 2210738 A1 | 7/2010 |
| GB | 1511060 A | 5/1978 |
| GB | 2437941 A | 11/2007 |

(56) References Cited

FOREIGN PATENT DOCUMENTS

| JP | 2001278517 A | 10/2001 |
|---|---|---|
| JP | 2007130810 A | 5/2007 |
| WO | WO1994/015789 A1 | 7/1994 |
| WO | WO2001/56787 A1 | 8/2001 |
| WO | 2002092343 A2 | 11/2002 |
| WO | WO2003/042312 A1 | 5/2003 |
| WO | WO2007/027619 A2 | 3/2007 |
| WO | WO2008/027816 A1 | 3/2008 |
| WO | WO2010/083729 A1 | 7/2010 |
| WO | WO2013/137216 A1 | 9/2013 |

OTHER PUBLICATIONS

International Search Report and Written Opinion for Application No. PCT/US2012/061362 dated Apr. 29, 2013 (16 pages).
Inventables, "Heat/Friction Disappearing Ink" <http://www.inventables.com/technologies/heat-friction-disappearing-ink> webpage website accessed Aug. 31, 2010.
Invitation to Pay Additional Fees And, Where Applicable, Protest Fee for Application No. PCT/US2012/061362 dated Feb. 13, 2013 (7 pages).
Label Zone, "Label Sensing: The Difference Between Gap, Line & None," <http://blog.labelzone.co.uk/tutorials/label-sensing/> website accessed Sep. 11, 2018.
New Method, "End Face Marking Tools," <http://www.newmethod.com/automatic-roll-marking.html> website accessed Sep. 11, 2018.
Pepperl + Fuchs, "Web Fed Printing," <https://www.pepperl-fuchs.com/usa/en/19898.htm> website accessed Sep. 11, 2018.
Ryeco Inc., "End of Roll Marking," <http://products.ryeco.com/viewitems/marking-systems/erm-end-of-roll-marking-system> website accessed Sep. 11, 2018.
Xyron, "Xyron ezLaminator Laminate Refill, 9" × 60', Two Sided," <https://www.amazon.com/Xyron-ezLaminator-Laminate-Refill-145612/dp/B000MK4SGU> website accessed Sep. 9, 2018.
International Search Report and Written Opinion for Application No. PCT/US2019/057318 dated Feb. 6, 2020 (23 pages).

\* cited by examiner

LAMINATING SYSTEM WITH CODED FILM CARTRIDGE

BACKGROUND

The present disclosure relates to laminating systems for laminating paper, cards, photos, or the like within a pair of transparent films by applying pressure and heat. Such machines are provided with adjustable settings for ensuring acceptable lamination results with a variety of different films having different specifications such as thickness, which may require different settings. This not only provides an opportunity for error in setup and poor results, but can be burdensome where the user(s) may need to switch among film types for various jobs.

SUMMARY

In one aspect, the invention provides a dual roll laminating film cartridge that includes a body defining a first end supporting a first end of a first roll of continuous translucent laminating film and a first end of a second roll of continuous translucent laminating film. The body further defines a second end supporting a second end of the first roll and a second end of the second roll, wherein facing surfaces of the films extended from the first and second rolls in an advancing direction are coated with a heat-activated adhesive. A bridge extends between the first and second ends of the body at a position between the first and second rolls, the bridge defining an article chute for the reception of articles to be laminated by the films of the first and second rolls. The cartridge further includes a code indicative of one or more characteristics of the film of the first and second rolls, the code comprising a predetermined flag pattern of coding tabs that project outward from the body.

In another aspect, the invention provides a laminating machine including a cartridge receptacle, a cartridge identification sensor, an article tray, a set of heat rollers, a set of pull rollers, an auto-feeder, a cutter assembly, and a controller. The cartridge receptacle is provided for receiving any one of a plurality of unique dual roll laminating film cartridges. The cartridge identification sensor is exposed to the cartridge receptacle and operable to identify a particular one of the plurality of unique dual roll laminating film cartridges by detecting a predetermined flag pattern of coding tabs at a plurality of predetermined positions with respect to the cartridge receptacle. The article tray is in communication with an inlet slot of the laminating machine. The set of heat rollers is heated by a heater and positioned in a downstream direction from the cartridge receptacle. The set of pull rollers is driven by a main motor and positioned downstream of the set of heat rollers. The auto-feeder is positioned in an upstream direction from the cartridge receptacle, the auto-feeder including a set of feed rollers operable by a feed motor to engage an article from the article tray and advance the article toward the set of heat rollers. The cutter assembly is operable to sever the laminated article from the remaining film of the dual roll laminating film cartridge following passage through the laminating section. The controller is provided in communication with a memory to receive a signal from the cartridge identification sensor and programmed to set operational parameters of one or both of the heater and the main motor in correspondence with a profile saved in the memory and pre-selected for the laminating film type of the particular one of the plurality of dual roll laminating film cartridges, the profile being one of a plurality of profiles saved in the memory, each of the plurality of profiles corresponding to laminating film type.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
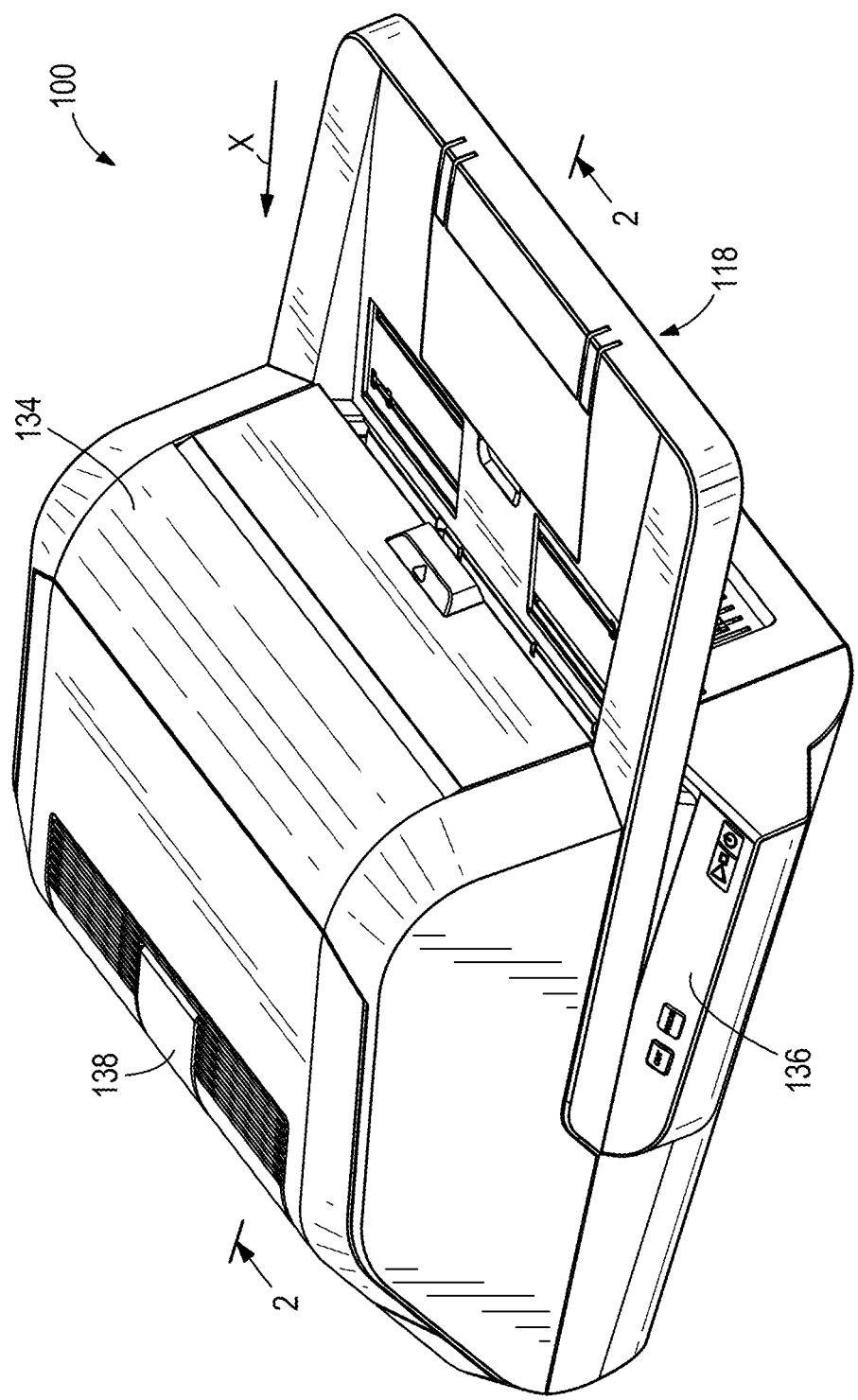
FIG. 1 is a perspective view of a laminating system including a laminating machine according to one embodiment of the invention.
Figure 2:
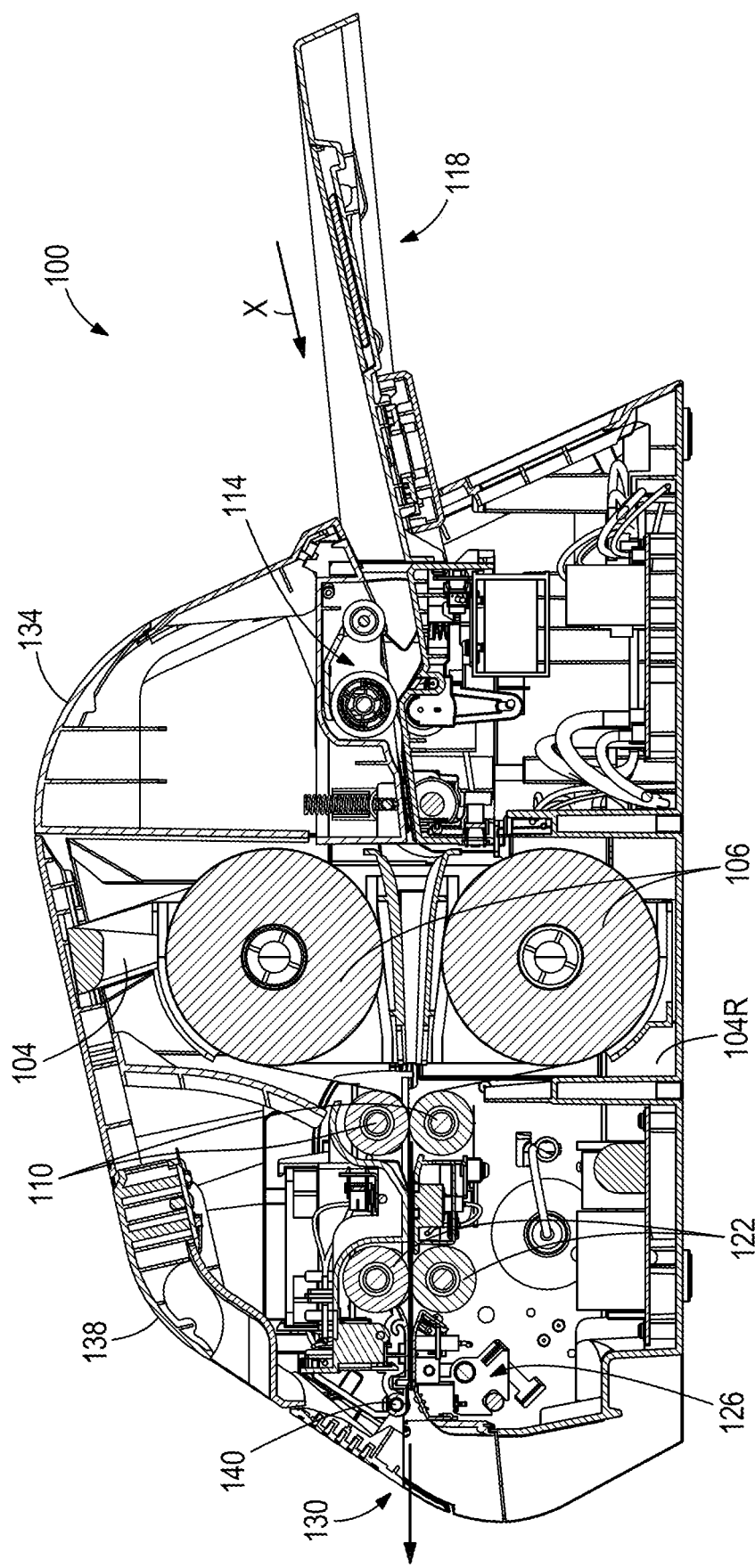
FIG. 2 is a cross-section view of the laminating system, taken along line 2-2 of FIG. 1.

FIGS. 1 and 2 illustrate a laminating system comprising a laminating machine 100 and a removable and replaceable laminating film cassette or cartridge 104 that fits into a receptacle 104R of the machine 100. The cartridge 104 can be keyed to the receptacle 104R of the machine 100 to allow fitment in only one prescribed orientation. The cartridge 104, which is described in further detail below, contains two parallel, spaced rotatable rolls 106 of continuous laminating film. The film webs include adhesive on the sides facing each other, and the adhesive may be heat-sensitive. The machine 100 thus includes a set of heat rollers 110 at a position downstream of the cartridge receptacle for activating the adhesive. The heat rollers 110 can be supplied with electrical energy in a variable manner, by a controller, in order to apply an appropriate amount of heat to the film webs and the adhesive thereof as the machine 100 conducts and advances the film webs and any article(s) therein through the machine 100. The articles can be any article suitable for laminating, including but not limited to paper, cards, or photos. Advancement of articles through the machine 100 is handled by an auto-feeder 114 that feeds articles from an inlet feed tray 118 to the film webs and by a set of pull rollers 122 downstream of the heat rollers 110 that pull the film-laminated article toward a cutter assembly 126 and an outlet chute 130. References herein to upstream and downstream directions are made in reference to the direction of movement of the article through the machine 100 from side to side along an x-axis. A y-axis is defined as the other planar article direction, extending front-to-back along the machine 100 perpendicular to the x-axis.

A housing 134 of the machine 100 (which is rendered phantom in FIGS. 3 and 5 to illustrate internal components) encloses the cartridge 104 along with functional elements of the machine 100, including the auto-feeder 114, the heat and pull rollers 110, 122, and the cutter assembly 126. The housing 134 also encloses electronics, such as a controller (e.g., processor and memory for storing data and executable instructions). As shown in FIG. 1, a control panel 136 providing a user interface can be provided on an outside surface of the housing 134. The user interface can include physical inputs (e.g., switches, buttons, etc.) and optionally an electronic display. In some constructions, the user interface can be provided wholly or in part by a touch screen interface. The housing 134 can further include a door 138 for accessing the cartridge 104, for example, for removal/replacement thereof. The door 138 can be pivotally mounted, although additional linkages and mechanisms are optional. The illustrated door 138 is supported at a pivot 140, which is a fixed pivot on the housing 134. The door 138 also supports upper ones of the heat and pull rollers 110, 122 such that upward movement of the door 138 gaps these upper rollers apart from their matching lower rollers for easy and automatic loading of the leading end tail of the film webs therebetween. The heat and pull rollers 110, 122 re-close to engage or pinch the leading end tail of the film webs upon closure of the door 138.

Figure 3:
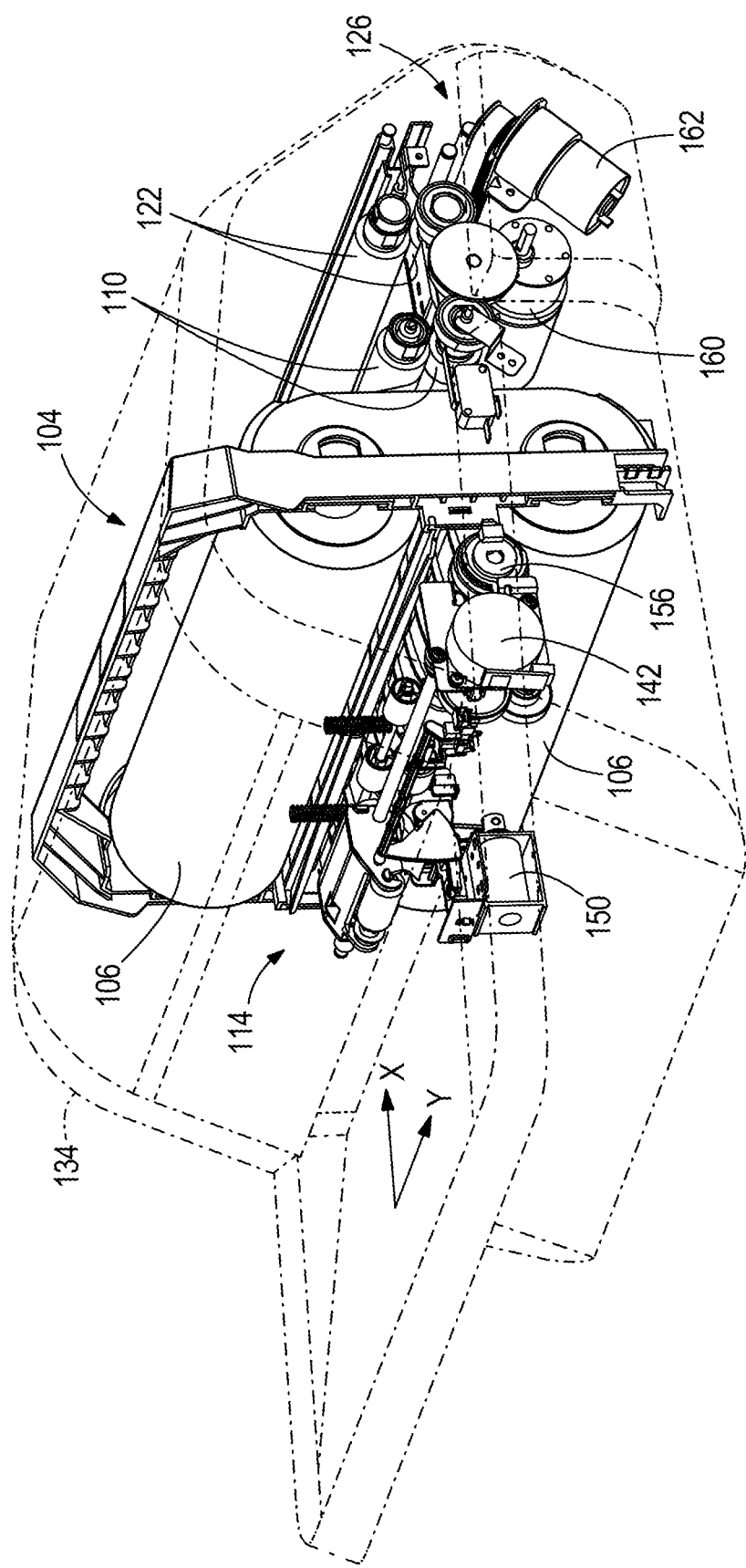
FIG. 3 is a perspective view illustrating a first grouping of internal components of the laminating machine in relation to a removable laminating film cartridge, with a housing of the laminating machine rendered in phantom.
Figure 4:
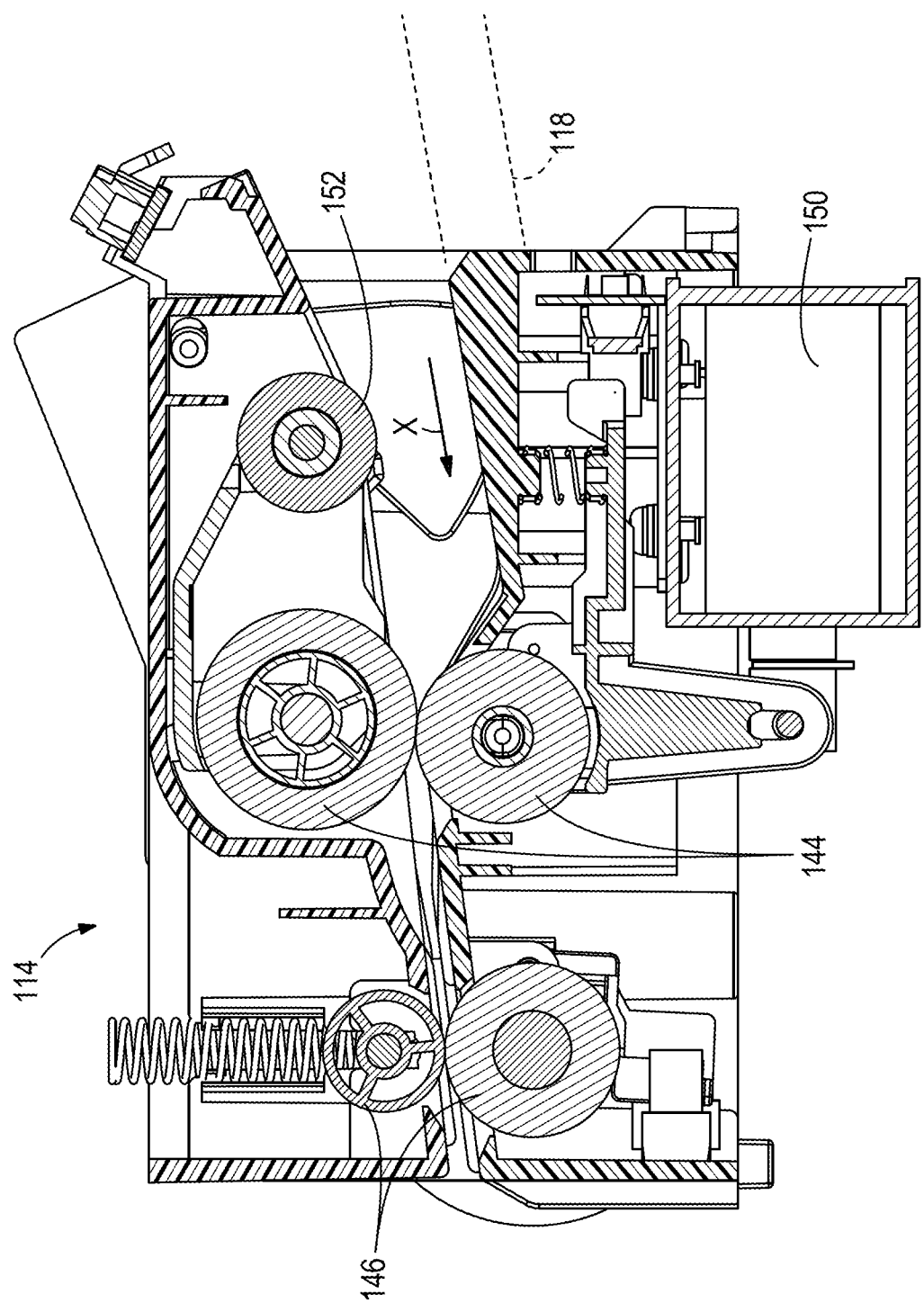
FIG. 4 is a cross-section view of an auto-feeder of the laminating machine.

Turning briefly to FIG. 3, a number of drive elements of the machine 100 are illustrated. Here the housing 134 and other portions of the machine 100 are rendered phantom to better illustrate the drive elements. First, the auto-feeder 114 includes a first or feeder motor 142 operable to drive multiple sets of rollers 144, 146 (FIG. 4). The first set of rollers 144 is nearest the feed tray 118 and the second set of rollers 146 is positioned downstream of the first set of rollers 144. With continued reference to FIG. 4, a solenoid 150 is provided to selectively disengage the first set of rollers 144 from each other, introducing a space or gap therebetween, for example when the machine 100 is put into a manual feed mode. For auto-feeding, the auto-feeder 114 also includes a pick roller 152 (i.e., single roller rather than roller pair) upstream of the first set of rollers 144. The pick roller 152 is the initial contact point for engaging an article on the feed tray 118. As shown, an article support surface for supporting a stack of articles can be provided in part by each of the feed tray 118 and an inlet section of the auto-feeder 114. Returning to FIG. 3, the machine 100 further includes a clutch 156 operable to selectively disable drive force from the feeder motor 142 from being delivered to the second set of auto-feed rollers 146. The clutch 156 can be an electronic clutch controlled by the controller to momentarily delay running compared to the first set of auto-feed rollers 144 (e.g., a pre-programmed time delay, or a delay based on article detection). Thus, the article to be delivered to the film webs by the auto-feeder 114 can be delivered by the first set of auto-feed rollers 144 so that its leading edge abuts into the stationary second set of auto-feed rollers 146 so that any skew present in the article (e.g., particularly a rectangular sheet, but not limited as such), relative to the x-axis and y-axis, is effectively minimized or eliminated before introducing the article to the film webs. Further downstream of the cartridge receptacle of the machine 100, there is provided a second or laminator motor 160 operable to drive the heat and pull rollers 110, 122. Further yet downstream, a third or cutter motor 162 is provided for driving the cutter element (e.g., knife, not shown) along the y-axis after the trailing end of the laminated article has passed.

Figure 5:
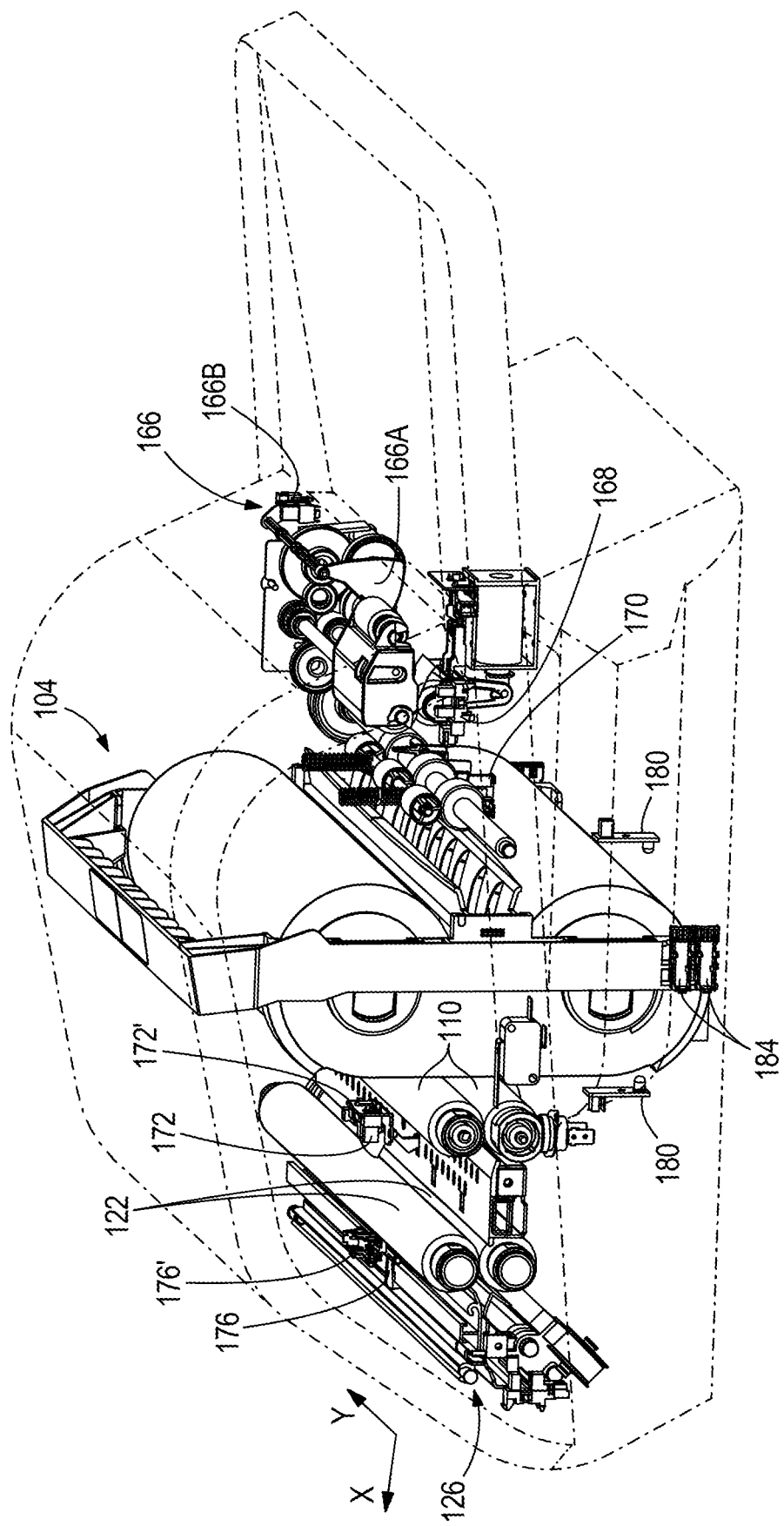
FIG. 5 is a perspective view illustrating a second grouping of internal components of the laminating machine in relation to a removable laminating film cartridge, with a housing of the laminating machine rendered in phantom.

FIG. 5 illustrates an array of sensors provided throughout the machine 100 for sensing things such as film presence, cartridge presence and type, article presence, and remaining film web, among others. A tray sensor 166 is operable to detect presence of an article in the feed tray 118. Although other constructions are optional, the tray sensor 166 includes a contact element 166A that pivots when contacted by the article(s) and serves as a flag for a photo interrupter sensing element 166B. Similar sensors 168, 170 operable for detecting an article at multiple locations along the auto-feeder 114 are provided adjacent the first and second set of rollers 144, 146, respectively. Furthermore, similar sensors 172, 176 are provided adjacent the heat rollers 110 and pull rollers 122, respectively. However, the sensors 172, 176 are contacted by the film webs when properly threaded through the rollers 110, 122. Thus, these serve as confirmation that the film is properly configured before allowing advancement of any articles. At or near the locations of each of the film presence sensors 172, 176, the machine further includes an optical sensor 172', 176' (e.g., a photo sensor) operable to detect the presence of the article. Thus, these article sensors 172', 176' are operable to detect when the leading edge of the article arrives as well as when the trailing edge of the article passes, which can be used for carrying out border control, or auto-feeder adjustment for sheet spacing, for example. The sensor 176' provides a final indication of the position of the article(s) just prior to cutting. All of the article sensors 168, 170, 172', 176' are operable to provide a positive confirmation of article leading and trailing edges. Although the machine's controller controls the speed of the motors 142, 160 conveying the article through the machine 100 and can operate according to an open-loop control, the sensors 168, 170, 172', 176' enable the provision of article position and/or speed feedback data to the controller for closed-loop control. This can assist in accounting for different surface finishes on various articles, minute amounts of slippage of the article and/or film during conveyance in the machine 100, etc.

Figure 11:
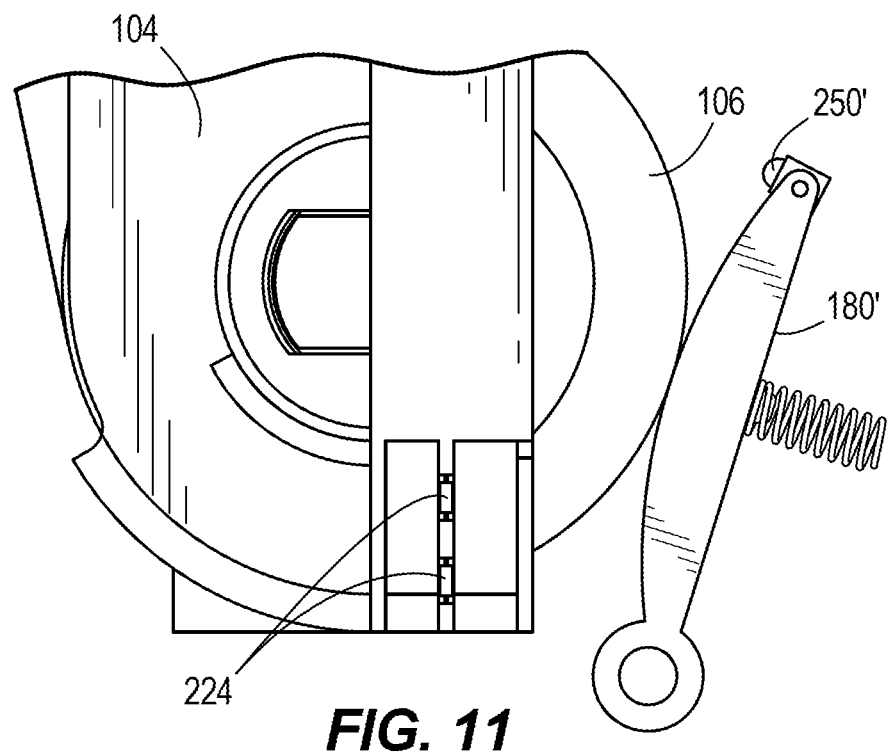
FIG. 11 is a side view of an end-of-film sensor according to another construction, which is integrated with the arm of a contact type continuous film level sensor.

Turning to cartridge sensing, the machine 100 includes a low film sensor 180, which can be in the form of a photo sensor adapted to detect a diameter of a film roll 106 dropping below a threshold value. For example, a light path blocked by the sensor 180 when the film roll 106 is at or above the threshold can be detected by a receiver portion of the sensor 180 when the film roll 106 drops below the threshold. An alternate type of low film sensor 180' is illustrated in FIG. 11 as a biased contact-type sensor that rides along the outer diameter of the film roll 106. The sensor 180' can be configured as a threshold sensor, similar to the above description, or as a continuous film level sensor that reports the current value of remaining film on the roll 106 to the controller. Finally, an array of cartridge sensors 184 detect the cartridge 104 when the cartridge 104 is positioned in the operable position within the cartridge receptacle 104R of the machine 100. Each of the sensors 184 is provided as a photo interrupter in the illustrated construction, and the sensors 184 are provided at opposite ends of the bottom of the cartridge receptacle 104R, although other constructions are optional. The cartridge sensors 184 are operable to detect presence of the cartridge 104, but also further information about the film rolls 106 of the cartridge as the various cartridges useable with the machine 100 are coded according to their unique characteristics as described in further detail below. In the illustrated construction, each end of the cartridge 104 (e.g., a lower end or foot portion thereof) is detected by two sensors 184, although only the two sensors 184 at one end are shown. The two sensors 184 at each end are vertically stacked.

Figure 6:
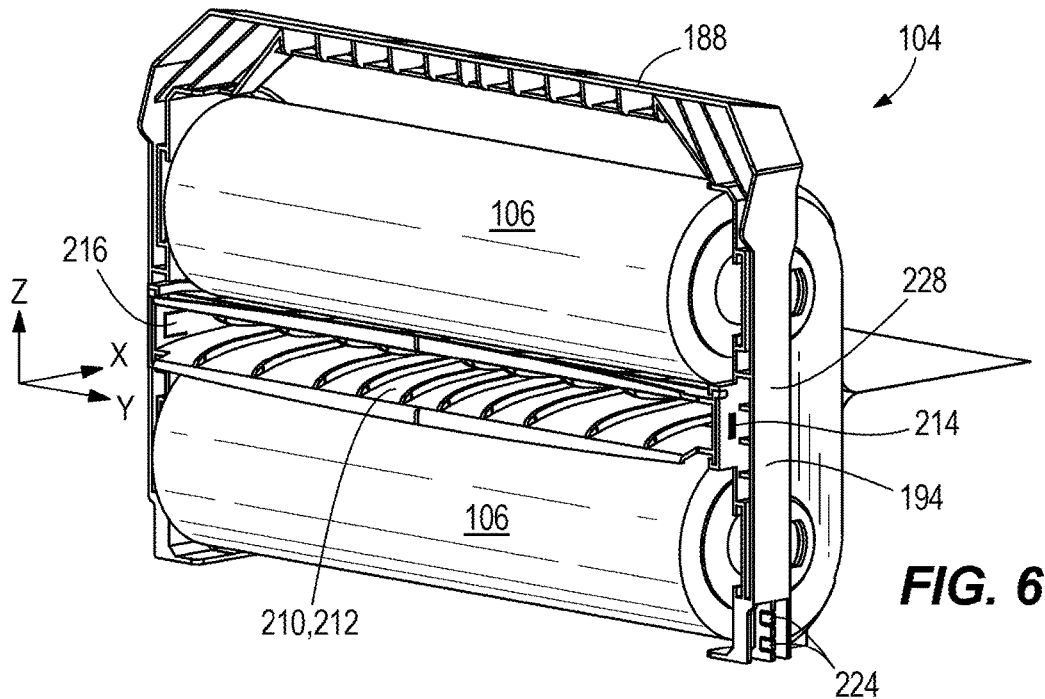
FIG. 6 is a perspective view of the laminating film cartridge.
Figure 7:
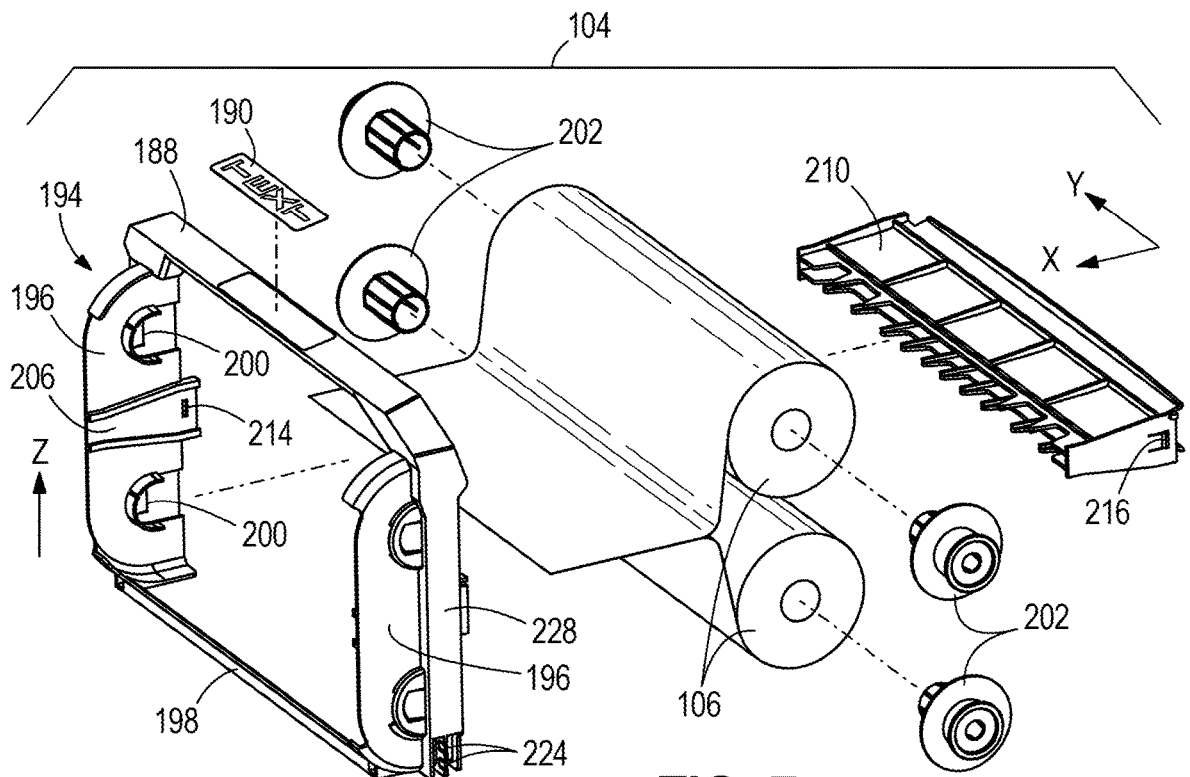
FIG. 7 is an exploded assembly view of the laminating film cartridge.
Figure 8:
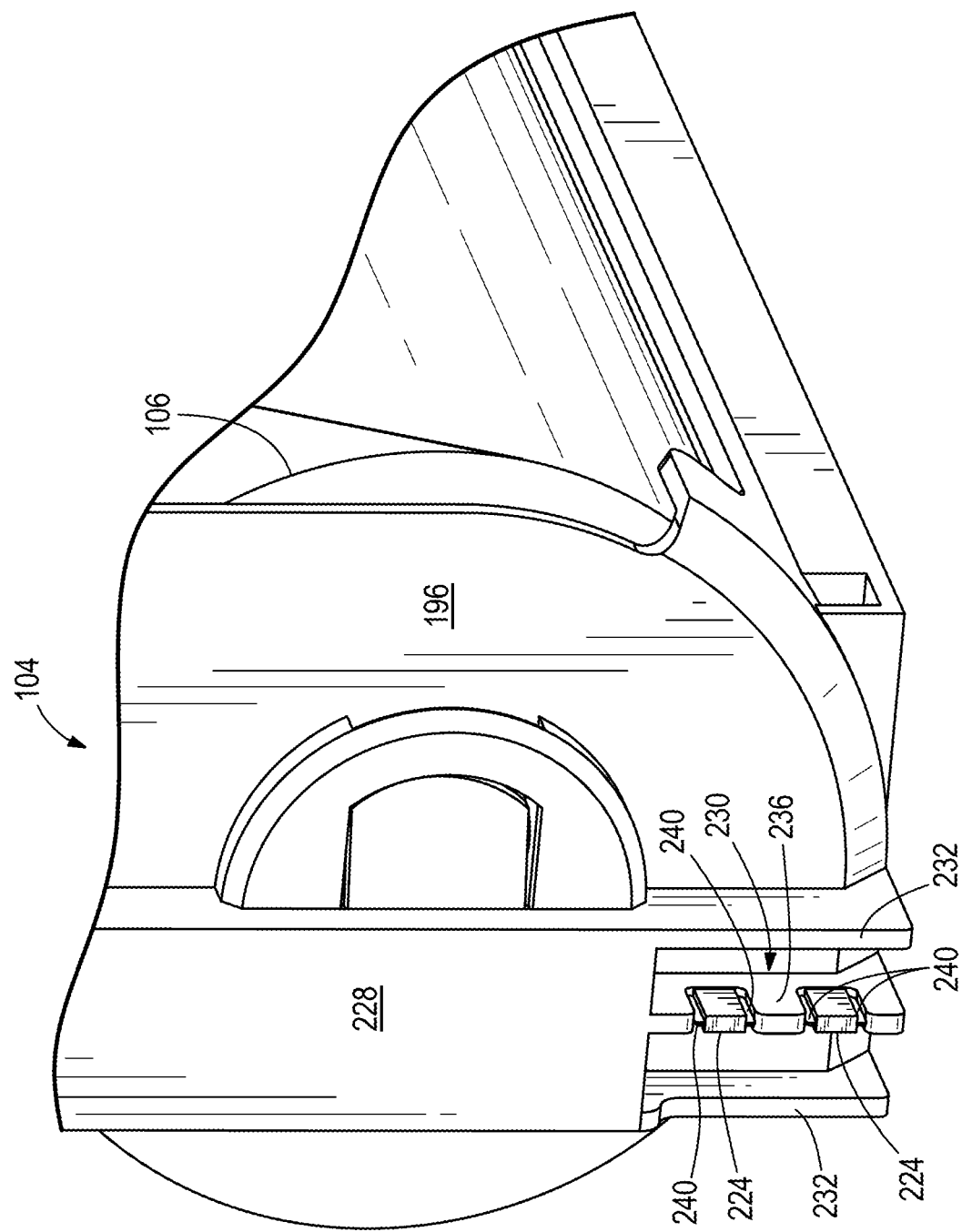
FIG. 8 is a detail perspective view of a coding portion of the laminating film cartridge.
Figure 12:
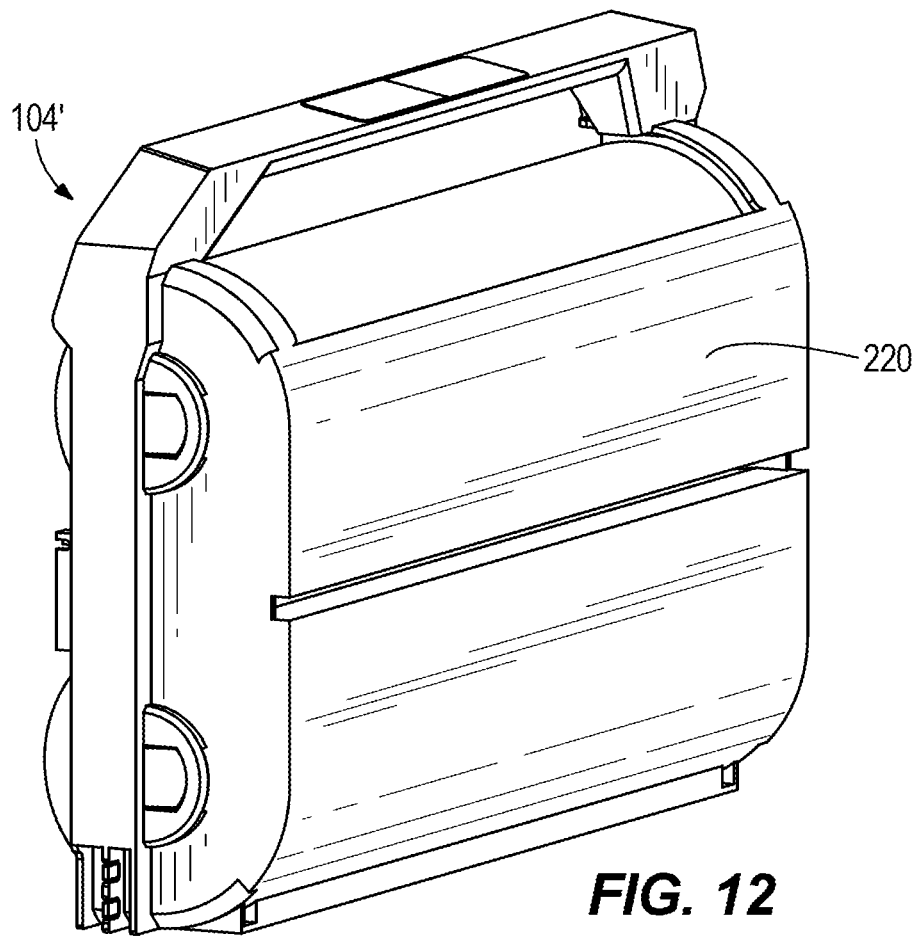
FIG. 12 is a perspective view of a laminating film cartridge according to another construction that is provided with integral heat shielding.

FIGS. 6 and 7 illustrate the cartridge 104 in further detail, with FIG. 7 providing an exploded assembly view thereof. As shown there, the cartridge 104 can be provided with a handle 188 at a top edge thereof. The illustrated handle 188 extends between the two opposing ends of the cartridge 104 across the entire y-axis width thereof. A label 190 can be provided with identifying indicia (e.g., human readable alpha-numeric characters) on the cartridge 104, for example on the handle 188, among other locations. The handle 188 can be provided as an integral part (e.g., unitarily molded part) of a cartridge body 194. The body 194 can include two opposed end plates 196. The body 194 can be provided with a lower cross member 198 spanning between lower ends of the end plates 196 such that the end plates 196 are connected both above and below the film rolls 106. Each end plate 196 includes film roll receptacles 200, vertically stacked in a z-axis and each configured to rotatably receive a film roll end cap 202 for in-place rotational as the film rolls 106 are used during operation of the machine 100. The body 194 also includes, in each end plate 196, a keyway 206 for receiving a bridge 210 of the cartridge 104. The bridge 210 is separately formed from the body 194 and engageable therewith at an intermediate position between the two film rolls 106. The bridge 210 fortifies the structure of the cartridge 104 and forms the article chute 212 through which articles are fed into the space between the two film webs. Thus, the position and integrity of the bridge 210 are critical to accurately feeding the articles for lamination. In combination with the keyway 206, the bridge 210 engages with the body 194 in a single predefined position by a positive snap connection therebetween, the body 194 and the bridge 210 having respective complementary elements 214, 216 of the snap connection. The bridge 210 is prevented from being assembled in a backward orientation with respect to the body 194. Separate formation of the bridge 210 with respect to the body 194 enables differentiation of material, though both may be of thermoplastic polymer construction in some embodiments. In some constructions, the bridge 210 is formed of a first material having a flexural strength greater than that of a second material from which the body 194 is formed. In one non-limiting example, the bridge 210 is constructed of polycarbonate and the body 194 is formed of acrylonitrile butadiene styrene (ABS). The bridge 210 can be molded stronger with ribs that could otherwise not be formed in the same tool with the body 194. Separating the construction of the bridge 210 from the body 194 imparts the ability to use one or a material that is stronger than that of the body 194, but also superior in terms of heat deflection temperature (i.e., a measure of a polymer's ability to bear a given load at elevated temperatures, for example in this case, an operational laminator temperature above ambient). For us it's both for heat deflection temperature and the stronger ribs in molding. Although not required in all constructions, FIG. 12 illustrates that a modified cartridge 104' can include an integral heat shield 220 that blocks the film (and adhesive) on the rolls 106 from the heat of the heat rollers 110.

As mentioned above, the cartridge 104 is coded as a means to convey the film specification to the machine 100 via the sensors 184. The film specification refers to physical attributes of the film on the rolls 106 (e.g., film thicknesses and y-axis film width). The cartridge 104 is part of a family of similar cartridges 104 that vary by film specification. The family of cartridges 104 can vary exclusively by film specification and coding related to the film specification. Each cartridge 104 is coded by selectively-present projecting tabs 224 that interrupt respective light beams of the sensors 184 when present. The cartridge 104 includes a set of coding tabs 224 at each end, including a first set of coding tabs 224 outboard of the first ends of the film rolls 106 and a second set of coding tabs 224 outboard of the second ends of the film rolls 106. Each set of coding tabs 224 can include one, two, or more coding tabs. The sets of coding tabs 224 are positioned at the bottom ends, or cartridge feet, provided by the cartridge end plates 196. More particularly, the tabs 224 are positioned at the bottom ends of vertical rib portions 228 of the end plates 196 that extend downwardly from the ends of the handle 188. Each tab 224 projects outward from the outside of the end plate 196, for example parallel to the y-axis, so that the tabs 224 of the two sets extends away from each other. The tabs 224 can be positioned in a concavity or pocket 230 formed in the cartridge body 194, the concavity being formed for example between two walls 232 spaced in the direction of the x-axis.

Figure 9:
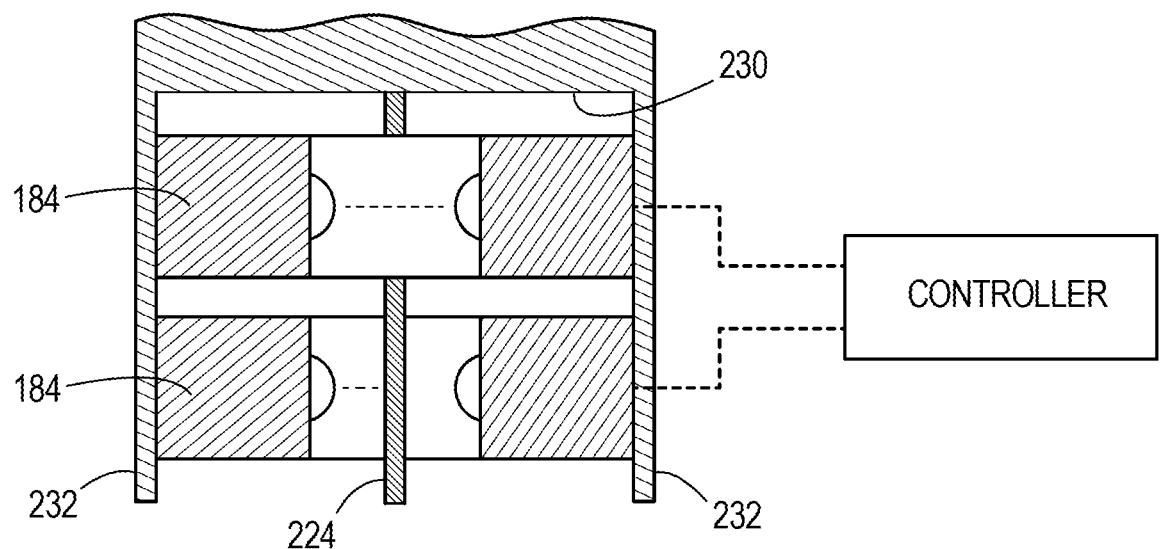
FIG. 9 is a cross-sectional view of the coding portion of the laminating film cartridge, during detection by a pair of photo sensors of the laminating machine.

All of the tabs 224 can be manufactured as integral portions of the body 194 (e.g., molded unitarily therewith). In fact, each and every cartridge 104 of the family, regardless of film specification, can be originally manufactured with a full set of the tabs 224 present or intact, including multiple tabs 224 at both ends. Each cartridge 104 may be subsequently coded by selective removal of a number of the tabs 224 (e.g., 0, 1, 2) from one or both sets. In some constructions, it may be desirable to use only codes that leave at least one tab 224 intact at each end of the cartridge 104 so that at least one sensor 184 at each end will positively detect the cartridge 104, regardless of the cartridge type, distinguishing the resulting signal from that of no cartridge being present. As illustrated, the coding tabs 224 in a given set are manufactured as frangible tab portions of a single, unitary projecting tab 236 on the cartridge body 194. For example, each coding tab 224 is integrally coupled to the unitary projecting tab 236 by at least one frangible section 240 having a weakened construction promoting separation from the unitary projecting tab 236. In other constructions, the coding tabs 224 may be independently coupled to the cartridge body 194 with frangible sections having a weakened construction. In accordance with the film specification of the film rolls 106 loaded into the cartridge body 194 at the time of manufacture, the cartridge manufacture may further include coding the cartridge 104 by selectively breaking off one or more of the coding tabs 224 at the frangible sections 240. FIG. 9 illustrates one example in which the cartridge 104 is coded by having only the lower tab 224 left intact, while the upper tab 224 has been removed. As such, the two sensors 184 on this side produce different signals for output to the controller, the upper sensor 184 detecting its light beam, and the lower sensor 184 having its light beam interrupted. On the opposite side, the cartridge 104 may have a single coding tab 224 (upper or lower), or may have both tabs 224 intact. Thus, the code for the cartridge 104 is determined cumulatively by the sets of coding tabs 224 on both ends of the cartridge 104. In other constructions, the entire code is present on both ends of the cartridge 104 in an arrangement for redundant detection. As illustrated, the cartridge sensors 184 are received at least partially into the pocket 230 of the cartridge body 194 when the cartridge 104 is inserted into the machine 100 in the operable position. The sensors 184 sense via light transmission parallel to the x-axis or the blockage of light transmission parallel to the x-axis.

Once the cartridge 104 is inserted and its code read by the sensors 184, the controller determines from the code how to configure the machine 100 according to the data in the memory. For example, the controller may set the power output to the heat rollers 110, and/or set a heat roller 110 set point temperature, to a distinct value based on a film characteristic (film thickness and/or adhesive type) that is conveyed via the code. In particular, the value set by the controller for heating may be higher for 4 mil film than for 3 mil film, and higher yet for 5 mil film. When the cartridge 104 is replaced by a cartridge 104 having a code for a different film characteristic, the controller will automatically change the heat setting accordingly to match the film characteristic so that user action to input the correct film type is not necessary. This is accomplished through various unique profiles saved in the memory and pre-selected for the unique laminating film types. Additionally, the saved profile corresponding to the cartridge code can be used by the controller in its control of the auto-feeder 114 and the cutter assembly 126. In particular, border control is automatically carried out through controller manipulation of the auto-feeder 114, the pull rollers 122, and the cutter assembly 126, e.g., for various standardized sheet dimensions. The machine 100 can thus be made universal for accommodating different types of standardized sheet dimensions used in different regions (e.g., North American legal or letter vs. ISO A3, A4, etc.). For example, A3 and A4 paper has a standardized dimension of 297 mm compared to North American letter sheets having an 11 inch (279.4 mm) dimension. Thus, cartridges 104 intended for use with A3 and A4 paper have film rolls 106 that are larger in the y-axis direction (i.e., "width" of the film web between cartridge ends, perpendicular to the total rolled length) than cartridges 104 intended for use with 8.5×11 inch paper. Accordingly, the controller will operate the auto-feeder 114 and the pull rollers 122 to set and maintain spacing of sequential sheets according to the film specification in order to provide x-axis spacing that further allows operation of the cutter mechanism 126 to automatically cut the film, without waste, to produce predetermined, even borders from the leading and trailing edges of the article to the edge of the film that are specific to the standardized sheet sizing corresponding to the cartridge 104.

As described above, the coding of the cartridges 104 can be operative to set multiple machine setup parameters (i.e., temperature setting and border setting). In other constructions, the machine 100 may be configured for only one or the other. However, it is further noted that additional setup parameters of the machine 100 can be enacted via the coded cartridges 104. These can include, without limitation, feed rate (i.e., speed of one or both motors 142, 160), and laminating pressure when equipped with a variable pressure mechanism. One or more of these alternate setup parameters may be used in lieu of or in addition to the temperature and border settings, such that any and all possible combinations are possible according to the intended usage of the machine 100 and compatible film types. Thus, by any one of these disclosed embodiments, the machine 100 is operable to set (and subsequently alter or re-set) one or more variable setup parameters for the laminating process by automatically distinguishing among different cartridges 104 containing different film types. As disclosed in the illustrated embodiment, the detection mechanism of the machine 100 includes effectively detecting a number of absent coding tabs 224 versus a number of present coding tabs 224, and furthermore, the discrete positions thereof (e.g., as a flag pattern wherein each intact coding tab 224 represents a flag). Though the machine setup parameters controlled by the identification of the coded cartridges 104 may refer to various auto-feed and/or auto-cut parameters for automatic lamination of article(s) from the feed tray 118, the same system operation may be utilized for configuring the machine 100 for manual lamination, e.g., with individual pouches that can be manually loaded with one or more articles by the user before being fed into the machine 100. This is in contrast to continuous roll lamination and does not require cutting to sever a film web from the roll. In fact, the cartridge 104 coded for enabling the machine 100 to perform manual lamination can be a dummy cartridge 104 having no film whatsoever. Thus, the cartridge 104 is merely a placeholder that is inserted into the machine 100 when lamination using pouches is desired by the user. Once the dummy cartridge 104 is in place, the user need not set any further parameters in some constructions, as the machine 100 is fully configured for proper pouch lamination operation.

Figure 10:
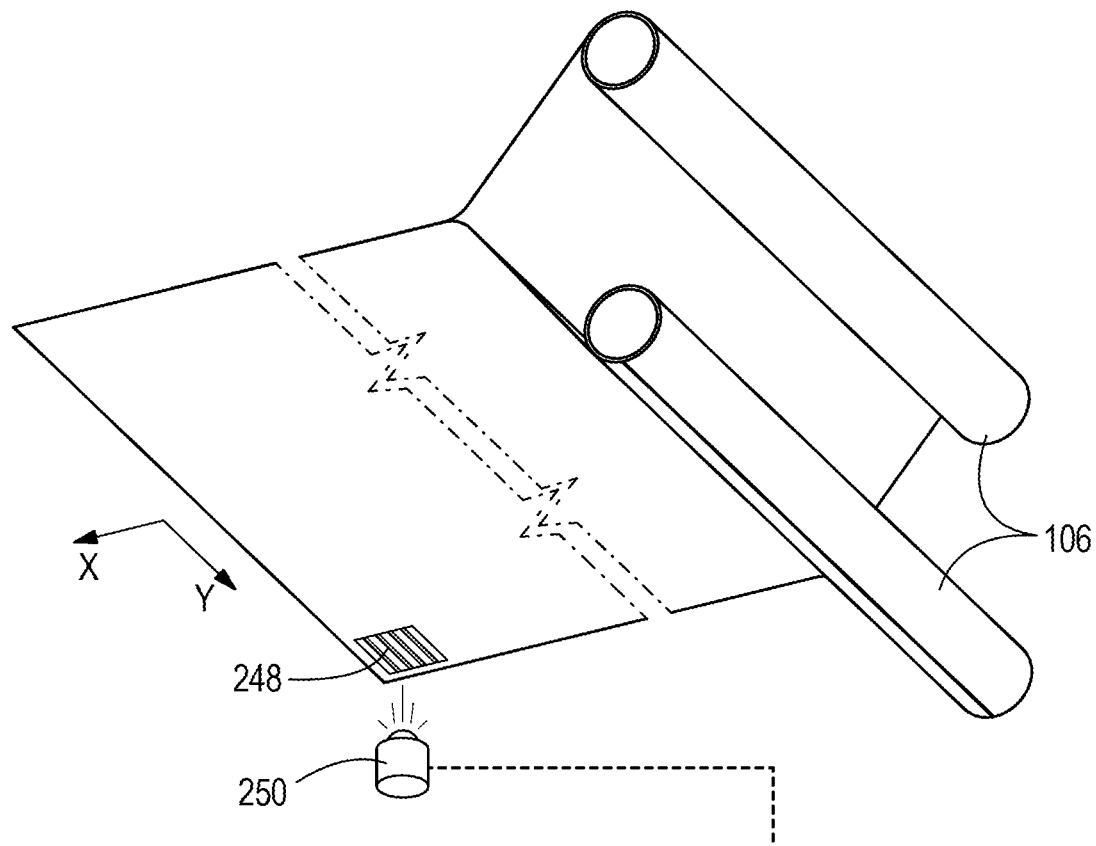
FIG. 10 is perspective view illustrating the end-of-film condition of the two film rolls of the cartridge, as well as a sensor of the laminating machine reading a reflective end-of-film label.

A further interactive feature of the laminating system provided by the machine 100 in combination with the cartridge 104 is the detection of the end of film on the rolls 106. This is separate from and may be in addition to a general low film detection or warning that may be triggered by monitoring a diameter of at least one of the rolls 106. As such, an end of roll indicator 248 is embedded in the film or provided by a label thereon. In the illustrated construction of FIG. 10, the end of roll indicator 248 is provided by a reflective label or sticker having a discernable pattern of high and low reflectivity portions (e.g., stripes) that can be optically detected by an end of roll sensor 250 that reports a signal to the controller. The reflective label can be easily removed by the user upon egress from the machine 100. The end of roll indicator 248 is placed at a predetermined distance (x-direction) from the actual end of the film on the roll 106 (e.g., an attachment point of the film to a core of the roll 106). The predetermined distance may be uniform among all cartridges 104 adapted for use with the machine 100, or the predetermined distance may vary in accordance with the width (y-direction) of the film rolls 106 installed on a given cartridge 104. In either case, the position of the end of roll indicator 248 is configured to allow a full sheet of standardized paper to complete lamination. The controller, when receiving the corresponding signal from the end of roll sensor 250, deactivates the auto-feeder 114 so that no further sheets are fed. An indication may be provided to the user to change the cartridge 104, but the lamination process for any sheet that has already been fed is unaffected and proceeds to completion as normal. In some constructions, an end of roll sensor 250' is provided as an optical sensor that directly observes the transition between the film and the film roll core (e.g. cardboard or plastic tube) and detects a change in reflectiveness and/or color in order to accurately detect the end of the film. Such an end of roll sensor 250' can be incorporated with the film sensor 180' as shown in FIG. 11.

Various features and advantages of the disclosure are set forth in the following claims.

What is claimed is:

1. A dual roll laminating film cartridge comprising:
   a body defining a first end supporting a first end of a first roll of continuous translucent laminating film and a first end of a second roll of continuous translucent laminating film, the body further defining a second end supporting a second end of the first roll and a second end of the second roll, wherein facing surfaces of the films extended from the first and second rolls in an advancing direction are coated with a heat-activated adhesive;
   a bridge extending between the first and second ends of the body at a position between the first and second rolls, the bridge defining an article chute for the reception of articles to be laminated by the films of the first and second rolls; and
   a code indicative of one or more characteristics of the film of the first and second rolls, the code comprising a predetermined flag pattern established by the selective presence of coding tabs that project outward from the body along a plurality of prescribed positions arranged in a row.

2. The dual roll laminating film cartridge claim 1, further comprising a handle provided at a top edge of the cartridge.

3. The dual roll laminating film cartridge claim 1, wherein the predetermined flag pattern is coded to identify a material thickness of the films of the first and second rolls.

4. The dual roll laminating film cartridge of claim 3, wherein the predetermined flag pattern is further coded to identify a film dimension perpendicular to a rolled length of film on the first and second rolls.

5. The dual roll laminating film cartridge of claim 1, wherein the predetermined flag pattern includes at least one coding tab on the first end of the body and at least one coding tab on the second end of the body.

6. The dual roll laminating film cartridge of claim 5, wherein the at least one coding tab on the first end of the body and the at least one coding tab on the second end of the body extend outward in opposite directions, outboard of the respective first and second ends of the first and second rolls.

7. The dual roll laminating film cartridge of claim 5, wherein the at least one coding tab on the first end of the body is positioned within a first concavity formed by a first pair of spaced walls, and wherein the at least one coding tab on the second end of the body is positioned within a second concavity formed by a second pair of spaced walls.

8. The dual roll laminating film cartridge of claim 1, wherein the first roll is a top roll and the second roll is a bottom roll, the body defining a first foot at a bottom of the first end and a second foot at a bottom of the second end, wherein the predetermined flag pattern is positioned adjacent the first and second feet.

9. The dual roll laminating film cartridge of claim 1, wherein the film of one of the first and second rolls includes an end of roll indicator embedded therein or provided by a label thereon.

10. The dual roll laminating film cartridge of claim 9, wherein the end of roll indicator is provided by a reflective sticker.

11. The dual roll laminating film cartridge of claim 1, wherein the bridge is a separate piece from the body.

12. The dual roll laminating film cartridge of claim 11, wherein the bridge is made of a material having a flexural strength greater than a material of the body.

13. The dual roll laminating film cartridge of claim 11, wherein the bridge is secured to the body by a snap connection.

14. The dual roll laminating film cartridge of claim 13, wherein the body includes a keyway into which the bridge is received for the snap connection.

15. The dual roll laminating film cartridge of claim 1, wherein the article chute defined by the bridge includes spaced apart upper and lower walls configured such that the article chute has a wider inlet end and a narrower outlet end.

16. The dual roll laminating film cartridge of claim 1, wherein the first roll is a top roll and the second roll is a bottom roll, the body defining opposed end plates and a lower cross member spanning between lower ends of the end plates below the bottom roll.

17. The dual roll laminating film cartridge of claim 1, further comprising a heat shield to block the rolls from heat generated by a laminating machine in which the cartridge is used.

18. The dual roll laminating film cartridge of claim 1, wherein the coding tabs project outward from the body in a direction parallel to a longitudinal direction of the rolls.

19. A dual roll laminating film cartridge comprising:
   a body defining a first end supporting a first end of a first roll of continuous translucent laminating film and a first end of a second roll of continuous translucent laminating film, the body further defining a second end supporting a second end of the first roll and a second end of the second roll, wherein facing surfaces of the films extended from the first and second rolls in an advancing direction are coated with a heat-activated adhesive;
   a bridge extending between the first and second ends of the body at a position between the first and second rolls, the bridge defining an article chute for the reception of articles to be laminated by the films of the first and second rolls; and
   a code indicative of one or more characteristics of the film of the first and second rolls, the code comprising a predetermined flag pattern of coding tabs that project outward from the body;
   wherein the predetermined flag pattern of coding tabs includes frangible coding tabs for coding the cartridge by selectively being broken off or left intact.

20. The dual roll laminating film cartridge claim 19, wherein the predetermined flag pattern of coding tabs is coded to identify a material thickness of the films of the first and second rolls, a film dimension perpendicular to a rolled length of film on the first and second rolls, or both.

* * * * *